United States Patent Office 2,898,205
Patented Aug. 4, 1959

2,898,205
METHOD OF KILLING PLANTS

William J. Pyne, Painesville, and Henry Bluestone, Cleveland Heights, Ohio, assignors to Diamond Alkali Company, Cleveland, Ohio, a corporation of Delaware No Drawing. Application February 27, 1956
Serial No. 567,724

10 Claims. (Cl. 71—2.5)

This invention relates to improvements in herbicidal compositions and more particularly relates to novel compositions and methods for controlling undesired plant growth.

Up to this time, many substances, both organic and inorganic, have been proposed and used as herbicides. The problem of controlling undesired plant growth is becoming increasingly acute as more and more land is utilized in farming, gardening and other applications wherein the control of undesired vegetation, including the myriad varieties of weeds, is essential. Accordingly, while a large number of herbicides have heretofore been proposed and have enjoyed varying degrees of commercial success, the problem of controlling plant growth remains a troublesome one.

Illustrative of prior herbicidal materials are such organic substances as 2,4–D and 2,4,5–T, carbamates, pentachlorophenol, and the like. Inorganic materials such as borax, salt, arsenites, cyanides, cyanates, chlorates, sulfamates, etc. also have been proposed. In many instances, these materials are satisfactory in specific applications. In other applications, however, they have enjoyed only a modicum of success. However, many of the more effective organic herbicides heretofore proposed have either been too costly for effective large scale use, or have involved the handling of toxic substances or materials which are dangerous or undesirable in application. On the other hand, many of the inorganic substances, such as borax or salt are more economical but, in many instances, suffer from the complaint that they are relatively inefficient or they are so completely non-selective and toxic as to sterilize soil for extened periods when such action is not desired.

Accordingly, it is a principal object of this invention to provide a new and improved plant growth regulating composition which not only is economical to produce and use but which is singularly effective.

A further object of this invention is the provision of new and improved herbicidal compositions and methods for controlling plant growth.

A still further object of this invention is to provide new and improved plant growth regulating compositions characterized by activity in pre-emergent applications.

These and other objects and advantages of the invention will appear more fully from the following description hereinafter set forth.

The present invention contemplates the use as a plant growth regulating material a composition which contains as an essential active toxic ingredient a compound of the formula:

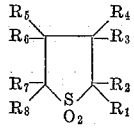

wherein $R_1$, $R_2$, $R_3$, $R_4$, $R_5$, $R_6$, $R_7$ and $R_8$ are the same or differeent radicals selected from the group consisting of hydrogen; hydroxy; alkyl radicals, such as methyl, ethyl, propyl, isopropyl and the like; aryl radicals, such as phenyl, naphthyl, etc.; alkaryl radicals, such as tolyl or xylyl; aralkyl radicals, such as benzyl or phenethyl; alkoxy radicals, such as methoxy, ethoxy and the like; and halogen radicals, i.e., chlorine, bromine, fluorine or iodine, chlorine preferred.

A preferred embodiment of this invention employs a compound of the above type wherein at least one of the substituent R's is selected from the group consisting of halogen, especially chlorine, and alkoxy, especially methoxy, optimum results being obtained with a polyhalogenated tetrahydrothiophene-1,1-dioxide, i.e., when at least two of the R substituents are halogens, preferably chlorine. The specifically preferred compound is 3,4-dichlorotetrahydrothiophene-1,1-dioxide.

Compositions embodying the present invention may be employed in a variety of herbicidal applications. The specific formulation of these compositions employed in accordance with this invention will depend, of course, to a large degree, upon the particular application contemplated. Hence, compositions embodying the invention may be utilized in any suitable manner as in soil application by spraying, drenching, or dusting. In addition, in many instances it is advantageous to introduce compositions of this invention directly into the soil.

In other applications, particularly foliage treatment, application may be made by spraying, drenching, immersion, and the like. Those skilled in the art will realize, of course, that at times systemic action is especially advantageous. Compounds embodying this invention generally are characterized by excellent systemic action.

As those skilled in the art will realize, it generally is desirable to formulate compositions such as those of this invention with various fillers, carriers, diluents, and the like, such as talc, sand, clays, dry soil, zeolite, kaolin, fuller's earth, kieselguhr, diatomaceous earth, chalk, gypsum, pyrophyllite, or other organic or inorganic materials, including active ingredients, such as fertilizers, insecticides, fungicides, and the like. Similarly, if a liquid drench or spray material is desired, a composition of this invention may be formulated as a liquid using as a carrier material various solvents, diluents, conditioners, extenders and the like, such as water, aromatic and aliphatic organic liquids, such as benzene and/or various alcohols, ethers, ketones and the like, as well as various petroleum fractions.

An especially advantageous form of compositions of this invention comprises concentrates emulsifiable in water, or other liquid. Illustrative of organic liquids which can be employed to form concentrates emulsifiable in water are cyclohexanone, 1,4-dioxane, dimethyl sulfoxide, dimethyl formamide, isophorone, and mesityl oxide. At present, it is preferred to employ mesityl oxide in preparing an emulsifiable concentrate, especially when 3,4-dichloro-tetrahydrothiophene - 1,1 - dioxide is used as the active herbicidal material.

Liquid compositions, notably emulsifiable concentrates as just described, may also contain minor quantities of one or more wetting agents, such as Igepal CO–880 (alkyl phenoxypolyoxyethylene ethanol), Arquad 2–C (quaternary ammonium compound of the formula RR'—N—(CH$_3$)$_2$Cl), Emulphor ON–870 (polyoxyethylated fatty alcohol), Tween 80 (polyoxyethylene sorbitan monooleate), Triton X–155 (alkyl aryl polyether alcohol), Trem 615 (polyhydric alcohol ester), Tween 85 (polyoxyethylene sorbitan trioleate), Nonic 218 (polyethylene glycol tertdodecyl thioether), Santomerse D (decyl benzene sodium sulfonate), Pluronic F–68 (condensate of ethylene oxide with an hydrophobic base formed by condensing propylene oxide with propylene glycol), Antarox A–400 (alkyl phenoxypolyoxyethylene ethanol), Triton X–120 (alkyl aryl polyether alcohol), Nacconol NRSF (alkyl aryl sulfonate), Aresol OS (isopropyl naphthylene sodium sulfonate), Span 40 (sorbitan monopalmitate), Triton B–1956 (modified phthalic glycerol alkyd resin), Antarox B–290 (polyoxyethylated vegetable oil), and Atlox G–3335 (alkyl aryl sulfonate blended with polyoxyethylene sorbitan esters of fatty acids and resin acids).

While compounds of the above type may be prepared by various means, they are advantageously prepared either alone, or in admixture, by reaction of a conjugated olefin and sulphur dioxide to form the intermediate cyclic unsaturated sulfone, followed by appropriate addition across the double bond. Hence, the practice of this invention contemplates the use as a herbicide of various addition derivatives of reaction products of conjugated olefins and sulphur dioxide, e.g., halogenated tetra-hydrothiophene-1,1-dioxides. It will be understood, of course, in the preparation of compounds embodying the present invention, that a pure compound need not necessarily be isolated and that purification is generally practicable only to the extent necessary for removing by-products and/or impurities which would disadvantageously affect the reaction yield or herbicidal activity.

In order that those skilled in the art may more completely understand the present invention and the preferred methods by which the same may be carried into effect, the following specific examples are offered:

EXAMPLE I

Part A

*Preparation of 2,5-dihydrothiophene-1,1-dioxide.*—Into a steel bomb are introduced 140 gms. of liquid 1,3-butadiene and 380 gms. of liquid sulfur dioxide, the gases being liquefied by prior cooling in a Dry Ice bath. The bomb is sealed and heated to a temperature of 100° C., a pressure of 300 p.s.i. being reached after one hour. Heating is continued until the pressure drops to 100 p.s.i. The bomb contents are then cooled to a temperature of 8° C. The product, after evolution of unreacted gases, is dissolved in acetone or other solvent in order to remove it from the bomb. The acetone is then removed by distillation, the crude product isolated thereby weighing 170 gms. (70% theoretical yield). The purified product after recrystallization is shown to be 2,5-dihydrothiophene-1,1-dioxide (butadiene sulfone).

Part B

*Preparation of 3,4-dichlorotetrahydrothiophene-1,1-dioxide.*—Into a round-bottom flask equipped with a stirrer, thermometer, and reflux condenser are introduced 100 gms. of 2,5-dihydrothiophene-1,1-dioxide dissolved in 400 ml. of carbon tetrachloride. The resulting solution is then heated to a temperature of 50° C. at which time 60 gms. of chlorine is gradually introduced. From the reaction mixture there is obtained a white precipitate weighing 159 gms. The analysis of the purified product indicates it to have the composition $C_4H_6Cl_2O_2S$:

| Constituent | Percent Calculated | Percent Actual |
| --- | --- | --- |
| Carbon | 21.40 | 21.67 |
| Hydrogen | 2.23 | 2.16 |
| Chlorine | 47.70 | 46.60 |

Part C

Experiments are conducted by admixing with the soil in separate 4" diameter clay pots containing as test plants growing tomato and beans plants, 250 mg. of 3,4-dichlorotetrahydrothiophene-1,1-dioxide of part B. The results indicate a high degree of herbicidal activity. On the scale of 0=no plant injury to 11=plant killed, ratings of 10 and 11, respectively, are obtained against the bean and tomato plants.

EXAMPLE II

Tabulated below are data demonstrating a high degree of phytotoxicity of other compounds within the scope of the generic structure claimed. Comparative results obtained are based upon use of 250 mg. of the specified compound per 4" pot as a direct soil application as in Example I, Part C.

| | Tomato | Bean |
| --- | --- | --- |
| 3-chloro-4-hydroxytetrahydrothiophene-1,1-dioxide | | 10 |
| 3,4-dibromotetrahydrothiophene-1,1-dioxide | Stunted | Wilted |
| 4-chloro-3-hydroxy-2,4-dimethyltetrahydrothiophene-1,1-dioxide | 8 | |
| 3-methoxytetrahydrothiophene-1,1-dioxide | 9 | 6 |
| 3-chlorotetrahydrothiophene-1,1-dioxide | 8 | 8 |
| No treatment | 0 | 0 |

EXAMPLE III

Using the 3,4-dichlorotetrahydrothiophene-1,1-dioxide produced in accordance with Example I, Parts A and B, a further series of experiments are conducted to illustrate the pre-emergent herbicidal activity of compounds of this invention. In these experiments, seed flats 12" x 14" are filled with soil, and are firmed and divided into 4 equal sections (6" x 7"). Two sections diagonally opposite each other, in each flat, are treated with 3,4-dichlorotetrahydrothiophene-1,1-dioxide at the rate of 20 and 40 lbs. per acre. Into the thus-treated soil and into the second pair of diagonally opposed similar but untreated flats are planted an equal number of rye grass seeds and covered by ⅛ inch of soil. The thus-prepared trays are watered from the bottom and maintained at room temperature under artificial light. The results of such experiments applying the 3,4-dichlorotetrahydrothiophene-1,1-dioxide as a 10% granular formulation (10% technical 3,4-dichlorotetrahydrothiophene-1,1-dioxide, 90% Attaclay) are as follows:

| Treatment | Rye Grass Seedling Counts | |
| --- | --- | --- |
| | 6 Days | 9 Days |
| None | 67 | 66 |
| 20 lbs. per acre | 25 | 20 |
| 40 lbs. per acre | 18 | 14 |

EXAMPLE IV

The procedure according to Example II is repeated except that the 3,4-dichlorotetrahydrothiophene-1,1-dioxide is applied to the soil as a 10% dust formulation. (10% technical 3,4-dichlorotetrahydrothiophene-1,1-dioxide, 90% pyrophyllite.) The result of such tests are as follows:

| Treatment | Rye Grass Seedling Counts | | |
| --- | --- | --- | --- |
| | 3 Days | 5 Days | 6 Days |
| None | 86 | 170 | 281 |
| 20 lbs. per acre | 3 | 17 | 33 |
| 40 lbs. per acre | 4 | 14 | 25 |

EXAMPLE V

The procedure of Example III is repeated except that the 3,4-dichlorotetrahydrothiophene-1,1-dioxide is employed as a 10% dust (10% technical 3,4-dichlorotetrahydrothiophene-1,1-dioxide, 90% pyrophyllite) and is blended with the soil in which the rye seeds are planted. The results of such tests are as follows:

| Treatment | Rye Grass Seedling Counts | | | |
|---|---|---|---|---|
| | 2 Days | 3 Days | 4 Days | 6 Days |
| 1,000 parts per million | 5 | 21 | 31 | 33 |
| 500 parts per million | 2 | 26 | 42 | 50 |
| None | 25 | 73 | 108 | 115 |

EXAMPLE VI

Further to illustrate herbicidal activity of compounds embodying this invention under actual field planting conditions, experiments are conducted by adding a granular composition containing 3,4-dichlorotetrahydrothiophene-1,1-dioxide (10% 3,4-dichlorotetrahydrothiophene-1,1-dioxide, 90% Attaclay) at the concentration of 40 lbs. per acre to the surface of a sandy soil and raking this composition to a depth of 2 or 3 inches and then wetting down the thus-treated soil.

Tomatoes are planted on the thus-prepared plots, one-half of each plot being planted immediately following application, the remainder being planted one week later. Three weeks after the initial planting it is observed that the treated areas are substantially free from grasses and broadleaf weeds thus indicating a pre-emergent herbicidal activity.

Examples of specific formulations embodying this invention are the following wherein the quantities are expressed in terms of percent by weight:

EXAMPLE VII

EMULSIFIABLE CONCENTRATE

| | |
|---|---|
| 3,4-dichlorotetrahydrothiophene-1,1-dioxide (technical grade, 90% active) | 15.5 |
| Mesityl oxide | 80.5 |
| Atlox G-3335 (Non-ionic-anionic emulsifier) | 4.0 |

EXAMPLE VIII

GRANULAR FORMULATION

| | |
|---|---|
| 3,4-dichlorotetrahydrothiophene-1,1-dioxide (technical grade, 90% active) | 11.2 |
| Granular "Attaclay" (30/60 RVM)[1] | 88.8 |

EXAMPLE IX

| | |
|---|---|
| 3,4-dichlorotetrahydrothiophene-1,1-dioxide (technical—90%) | 10.53 |
| Flo Float (inert mineral carrier) | 89.47 |
| Density [2]—42.5 lbs./cu. ft. | |

EXAMPLE X

| | |
|---|---|
| 3,4-dichlorotetrahydrothiophene-1,1-dioxide (technical) | 10.53 |
| Flo Float—Barden AG Clay (70–30) | 89.47 |
| Density [2]—31.6 lbs./cu. ft. | |

EXAMPLE XI

| | |
|---|---|
| 3,4-dichlorotetrahydrothiophene-1,1-dioxide (technical) | 10.53 |
| Flo Float—Barden AG Clay (60–40) | 89.47 |
| Density [2]—30.1 lbs./cu. ft. | |

EXAMPLE XII

| | |
|---|---|
| 3,4-dichlorotetrahydrothiophene-1,1-dioxide (technical) | 21.05 |
| Flo Float—Barden AG Clay (70–30) | 78.95 |
| Density [2]—33.5 lbs./cu. ft. | |

EXAMPLE XIII

| | |
|---|---|
| 3,4-dichlorotetrahydrothiophene-1,1-dioxide (technical) | 21.05 |
| Flo Float—Barden AG Clay (60–40) | 78.95 |
| Density [2]—33.33 lbs./cu. ft. | |

EXAMPLE XIV

| | |
|---|---|
| 3,4-dichlorotetrahydrothiophene-1,1-dioxide (technical) | 21.05 |
| Flo Float | 39.48 |
| Barden AG Clay | 39.47 |
| Density [2]—30.10 lbs./cu. ft. | |

[1] Through 30 mesh, retained by 60 mesh screen, readily disintegratable in water. Typical analysis of "Attaclay," based on oxides present and in terms of percent by weight is as follows:

| | |
|---|---|
| SiO | 67.0 |
| $Al_2O_3$ | 12.5 |
| MgO | 11.0 |
| $Fe_2O_3$ | 4.0 |
| CaO | 2.5 |
| Misc. | 3.0 |

[2] Density measured with a Scott volumeter.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of regulating plant growth which includes the step of contacting a plant with a composition containing a phytotoxic amount of a substance of the formula:

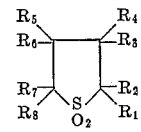

wherein $R_1$, $R_2$, $R_3$, $R_4$, $R_5$, $R_6$, $R_7$ and $R_8$ are selected from the group consisting of hydrogen, hydroxy, lower alkyl, aryl, lower alkoxy and halogen radicals.

2. The method of regulating plant growth which includes the step of applying to soil a composition containing a phytotoxic amount of a substance of the formula:

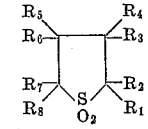

wherein $R_1$, $R_2$, $R_3$, $R_4$, $R_5$, $R_6$, $R_7$ and $R_8$ are selected from the group consisting of hydrogen, hydroxy, lower alkyl, aryl, lower alkoxy and halogen radicals.

3. The method of controlling plant growth which comprises subjecting a plant to a liquid composition containing as an essential active ingredient a phytotoxic amount of a compound of the formula:

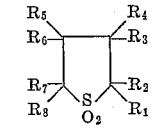

wherein $R_1$, $R_2$, $R_3$, $R_4$, $R_5$, $R_6$, $R_7$ and $R_8$ are selected from the group consisting of hydrogen, hydroxy, lower alkyl, aryl, lower alkoxy and halogen radicals.

4. The method of controlling plant growth which comprises subjecting a plant to a finely-divided composition containing as an essential active ingredient a phytotoxic amount of a compound of the formula:

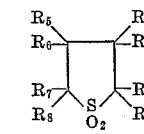

wherein $R_1$, $R_2$, $R_3$, $R_4$, $R_5$, $R_6$, $R_7$ and $R_8$ are selected from the group consisting of hydrogen, hydroxy, lower alkyl, aryl, lower alkoxy and halogen radicals.

5. The method of controlling plant growth which comprises treating the soil in which it is desired to control plant growth with a phytotoxic amount of a compound of the formula:

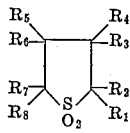

wherein $R_1$, $R_2$, $R_3$, $R_4$, $R_5$, $R_6$, $R_7$ and $R_8$ are selected from the group consisting of hydrogen, hydroxy, lower alkyl, aryl, lower alkoxy and halogen radicals.

6. The method according to claim 5 wherein the compound is embodied in a liquid formulation.

7. The method of controlling plant growth which comprises applying to the soil wherein control of plant growth is desired, a herbicidal concentration of a composition containing as an active ingredient a halogenated tetrahydrothiophene-1,1-dioxide.

8. The method of controlling plant growth which comprises applying to the plant wherein control of plant growth is desired, a herbicidal concentration of a finely divided composition containing as an active ingredient a halogenated tetrahydrothiophene-1,1-dioxide.

9. The method of claim 7 wherein the halogenated compound is 3,4-dichlorotetrahydrothiophene-1,1-dioxide.

10. The method of claim 8 wherein the halogenated compound is 3,4-dichlorotetrahydrothiophene-1,1-dioxide.

References Cited in the file of this patent

UNITED STATES PATENTS

| | | |
|---|---|---|
| 2,393,925 | Morris et al. | Jan. 29, 1946 |
| 2,461,340 | Morris et al. | Feb. 8, 1949 |
| 2,465,912 | Morris et al. | Mar. 29, 1949 |
| 2,610,192 | Mahan et al. | Sept. 9, 1952 |
| 2,624,664 | Mowry et al. | Jan. 6, 1953 |
| 2,656,362 | Faith | Oct. 20, 1953 |
| 2,723,190 | Schlesinger | Nov. 8, 1955 |
| 2,723,191 | Schlesinger et al. | Nov. 8, 1955 |